(12) United States Patent
Kawano et al.

(10) Patent No.: US 7,144,164 B2
(45) Date of Patent: Dec. 5, 2006

(54) OPTICAL DEVICE AND METHOD OF MANUFACTURING THE SAME

(75) Inventors: Taketo Kawano, Yamanashi (JP);
Koichi Iwaida, Yamanashi (JP);
Atsushi Ugai, Yamanashi (JP)

(73) Assignee: Fujitsu Quantum Devices Limited, Nakakoma-gun (JP)

( * ) Notice: Subject to any disclaimer, the term of this patent is extended or adjusted under 35 U.S.C. 154(b) by 38 days.

(21) Appl. No.: 10/244,757

(22) Filed: Sep. 17, 2002

(65) Prior Publication Data

US 2003/0053761 A1 Mar. 20, 2003

(30) Foreign Application Priority Data

Sep. 19, 2001 (JP) ............... 2001-284578

(51) Int. Cl.
*G02B 6/36* (2006.01)
(52) U.S. Cl. ....................................... 385/86
(58) Field of Classification Search ................. 385/86, 385/87, 136, 81
See application file for complete search history.

(56) References Cited

U.S. PATENT DOCUMENTS

| 4,673,245 A | 6/1987 | Kling et al. |
| 4,812,009 A * | 3/1989 | Carlisle et al. ............... 385/62 |
| 5,073,042 A | 12/1991 | Mulholland et al. |
| 5,222,169 A | 6/1993 | Chang et al. |
| 5,390,270 A * | 2/1995 | Hanzawa et al. ............. 385/81 |
| 5,768,455 A * | 6/1998 | Konik ......................... 385/86 |
| 5,781,681 A * | 7/1998 | Manning ..................... 385/86 |
| 6,018,606 A * | 1/2000 | Sogabe et al. ............. 385/136 |
| 6,302,594 B1 * | 10/2001 | Lee ............................. 385/87 |
| 6,491,445 B1 * | 12/2002 | Abendschein ................ 385/87 |
| 2002/0154872 A1 * | 10/2002 | Miyokawa ................... 385/92 |

FOREIGN PATENT DOCUMENTS

| EP | 0 297 439 A2 | 1/1989 |
| EP | 1 122 566 A2 | 8/2001 |
| JP | 58-52887 | 3/1983 |
| JP | 60-185907 | 9/1985 |
| JP | 2-195301 | 8/1990 |
| JP | 2002-116354 | 4/2002 |
| JP | 2002-318329 | 10/2002 |

* cited by examiner

*Primary Examiner*—Chau N. Nguyen
(74) *Attorney, Agent, or Firm*—Westerman, Hattori, Daniels & Adrian, LLP.

(57) ABSTRACT

An optical device includes a rigid pipe provided to cover the outer peripheries of a fixing joint portion and an optical fiber. The tip portion of the rigid pipe has a gap for providing flexibility between the optical fiber and the tip portion. Therefore, the rigid pipe suppresses bending of the optical fiber to avoid concentration of stress in the fixing joint portion for fixing the optical fiber to an optical unit section, thereby avoiding breakage of the optical fiber in the fixing joint portion.

12 Claims, 5 Drawing Sheets

OPTICAL DEVICE AND METHOD OF MANUFACTURING THE SAME

BACKGROUND OF THE INVENTION

1. Field of the Invention

The present invention relates to an optical device for optical communication using an optical fiber as a transmission medium, and particularly to a mechanism for connecting the optical fiber to an optical unit by using a ferrule.

2. Description of the Related Art

As an optical device used in an optical communication, an optical module comprising an optical fiber connected to an optical unit by using a ferrule is used in various applications. FIG. 1 is an enlarged sectional view showing a conventional example of a connection portion of an optical fiber in an optical module provided with a ferrule. In the specification, for the sake of ease of description, the right side of each of FIGS. 1 to 7D represents the front side of the optical device, and the left side represents the rear side of the optical device.

Referring to FIG. 1, an optical fiber 1 is inserted into a ferrule 3a provided at the front of an optical unit section (not shown in FIG. 1) from the front side, and fixed to the optical unit section. This structure will be described in detail below.

The optical fiber 1 has a structure in which a glass portion 1a comprising a clad and a core is coated with a UV resin layer 1b, and further coated with a coating layer 1c of a nylon or elastomer material.

The glass portion 1a of the optical fiber 1 is exposed in the vicinity of the rear end (the left side of the drawing), and the rear end of the glass portion 1a is press-fitted into a capillary 3a-2 made of zirconia. The rear end surface of the capillary 3a-2 is polished together with the glass portion 1a of the optical fiber 1. The optical fiber 1 and the capillary 3a-2 are covered with a metal blank 3a-1, and the optical fiber 1 is further fixed to the blank 3a-1 at the fixing joint portion 2 with an adhesive composed of an epoxy resin or the like. The capillary 3a-2 into which the optical fiber 1 is press-fitted, and the blank 3a-i are fixed to the front side of a case (not shown in FIG. 1) in which an optical part is contained. The capillary 3a-2 and the blank 3a-1 is formed as the ferrule, which constitutes a part of the optical unit section.

As described above, in the conventional optical device, the optical fiber serving as a transmission medium is fixed to the optical unit section, for exsample to the blank 3a-1, with an adhesive or the like. In such an optical device in which the optical fiber 1 is fixed and connected, the outer peripheries of the ferrule and the optical fiber 1 which is exposed from the front of the ferrule are covered with a flexible tube 5 (cap) made of a flexible material such as rubber or elastomer. In this structure, the bend radius of the optical fiber 1 is increased as much as possible to decrease the bending stress exerted on the optical fiber 1, suppressing breakage of the optical fiber 1.

However, the conventional optical device comprising the flexible tube 5 for covering may cause breakage of the optical fiber 1 during the work of installing the optical fiber 1 to the optical device. The problem of breakage cannot be easily solved even by the method of disposing a protecting member made from an elastic member (specifically, a coil spring) in the flexible tube 5 because the fiber breaking load (breakage resistance) is not changed.

SUMMARY OF THE INVENTION

Accordingly, it is an object of the present invention to improve the breakage resistance of an optical fiber in an optical device in which the optical fiber is fixed and connected to an optical unit section.

As a result of observation of a broken optical fiber, the inventors found that referring to FIG. 1, breakage of the optical fiber is concentrated in the vicinity of the tip 8 of the fixing joint portion 2 where the optical fiber 1 is fixed to the blank 3a-1 by an adhesive agent.

As a result of intensive research based on the above finding, the inventors found that by disposing a rigid pipe for covering the fixing joint portion, the stress concentration at the tip of the fixing joint portion caused by bending of the optical fiber is relieved, thereby improving the breakage resistance of the optical fiber. The present invention relates to an optical device comprising such a rigid pipe. The rigid pipe being a separate part from the optical unit section so as to be movable relative thereto.

In a first aspect of the present invention, an optical device comprises a fixing joint portion for fixing, to an optical unit section, an optical fiber extending forward, and a rigid pipe having a tip portion which covers an outer periphery of the optical fiber with a gap for providing flexibility between the optical fiber and the tip portion, the rigid pipe extending rearward from the tip portion to cover the outer peripheries of the optical fiber and the fixing joint portion.

In this construction, the rigid pipe covers the outer periphery of the fixing joint portion and further extends to the outer periphery of the optical fiber extending forward beyond the fixing joint portion. There is a gap between the tip portion of the rigid pipe and the outer periphery of the optical fiber 1 to provide flexibility in bending of the optical fiber.

As described above, in the construction, the breakage resistance of the optical fiber is improved by providing the rigid pipe. In addition, there is the gap between the tip portion of the rigid pipe and the optical fiber, and thus concentration of stress at the tip of the rigid pipe can be avoided. Therefore, the breakage resistance of the optical fiber at the tip of the rigid pipe is improved.

When a flexible tube is further provided for covering the optical fiber extending forward beyond the tip of the rigid pipe, bending of the optical fiber can be further suppressed. The flexible tube can be disposed to cover the rigid pipe in such a manner that the end (front end) of the flexible tube is positioned in front of the tip of the rigid pipe. The flexible tube may be joined to the tip of the rigid pipe.

The rigid pipe may have rigidity sufficient to effectively suppress bending of the optical fiber, and this rigid pipe can be realized by using a material with high rigidity or a structure with high rigidity. For example, the rigid pipe may be made of a metal. More specifically, a metal selected from Fe, Cu and Al, or an alloy comprising any of these metals as a main component may be used. The rigid pipe may be made of a resin or plastic.

The rigid pipe can be formed as a separate part from the optical unit section. In this case, the rigid pipe can be supported so that it can freely be moved relative to the optical unit section and the optical fiber at least in the radial direction. This can prevent bending of the optical fiber with a small radius of curvature (referred to as "sharp bending" hereinafter).

The rigid pipe may be formed as a separate part from the optical unit section. In this case, the rigid pipe can be formed in a shape in which the radial thickness is thinned at the tip portion to impart flexibility to the tip portion, and is thickend at a portion covering the fixing joint portion. This shape can also prevent sharp bending of the optical fiber at the tip of the rigid pipe.

Alternatively, the inner surface of the tip of the rigid pipe may be chamfered to prevent sharp bending of the optical fiber. When the chamfer is rounded, sharp bending of the optical fiber can be further effectively prevented. Furthermore, by making the chamfered tip of the rigid pipe thicker than the rear end, sharp bending of the optical fiber can be suppressed.

In the fixing joint portion, the optical fiber may be fixed to the optical unit section by adhesive bonding or caulking.

The inventor of the present invention further found that even when the rigid pipe for covering the fixing joint portion between the optical fiber and the optical unit section is provided on the outside of the flexible tube, like in the first aspect, the breakage resistance of the optical fiber is improved.

In a second aspect of the present invention based on this finding, an optical device comprises a fixing joint portion for fixing an optical fiber to an optical unit section, a flexible tube for covering outer peripheries of the fixing joint portion and the optical fiber, and a rigid pipe provided on an outer periphery of the flexible tube to cover at least the outer periphery of the fixing joint portion.

The rigid pipe can be formed as a separate part from the flexible tube. Furthermore, the rigid pipe can be fitted onto the flexible tube and fixed.

The inventors of the present invention further found that even when the rigid pipe for covering the fixing joint portion between the optical fiber and the optical unit section is buried in the flexible tube, the breakage resistance of the optical fiber can be improved.

In a third aspect of the present invention based on this finding, an optical device comprises a fixing joint portion for fixing an optical fiber to an optical unit section, a flexible tube for covering outer peripheries of the fixing joint portion and the optical fiber, and a rigid pipe buried in the flexible tube to cover at least the outer periphery of the fixing joint portion.

The inventor of the present invention further found that when an extension pipe is provided on the outside of the rigid pipe for covering the fixing joint portion between the optical fiber and the optical unit section so that the extension pipe extends from the tip of the rigid pipe, sharp bending of the optical fiber can be prevented to improve breakage resistance.

In a fourth aspect of the present invention based on the above finding on the extension pipe, an optical device comprises a fixing joint portion for fixing, to an optical unit section, an optical fiber extending forward, a rigid pipe having a tip portion which covers an outer periphery of the optical fiber with a gap for providing flexibility between the optical fiber and the tip portion, the rigid pipe extending rearward from the tip portion to cover the outer peripheries of the optical fiber and the fixing joint portion, and an extension pipe provided in front of the rigid pipe so as to overlap at least a portion of the tip portion and having an inner diameter larger than an outer diameter of the rigid pipe at the overlaping portion. The extension pipe may be either rigid or flexible as long as bending of the optical fiber positioned in front of the tip of the rigid pipe is limited.

In the fourth aspect of the present invention, when the extension pipe is provided to be movable relative to the rigid pipe at least in the radial direction, the breakage resistance of the optical fiber can be improved. The extension pipe may be made of the same material as the rigid pipe.

In the present invention, the rigid pipe can be formed so that the inner diameter of the tip portion is smaller than that of a portion for covering the fixing joint portion. In this case, the degree of freedom of the optical fiber bending in the tip portion is restricted, and bending of the optical fiber with the fixing joint portion as a fulcrum is decreased to improve the breakage resistance.

As described above, in the present invention, the tip of the rigid pipe is positioned in front of the fixing joint portion, and thus the breakage resistance of the optical fiber is improved. Therefore, in a fifth aspect of the present invention, there is provided a method of manufacturing an optical device comprising a fixing joint portion for fixing an optical fiber extending forward to an optical unit section, and a rigid pipe having a tip portion which covers the outer periphery of the optical fiber with a gap for providing flexibility between the optical fiber and the tip portion, the rigid pipe extending rearward from the tip portion to cover the outer peripheries of the optical fiber and the fixing joint portion. The method comprises fixing the optical fiber in such a manner that the fixing joint portion does not project beyond the tip portion of the rigid pipe.

DESCRIPTION OF THE PREFERRED EMBODIMENTS

The present invention will be described in detail below with reference to embodiments.

Figure 1:
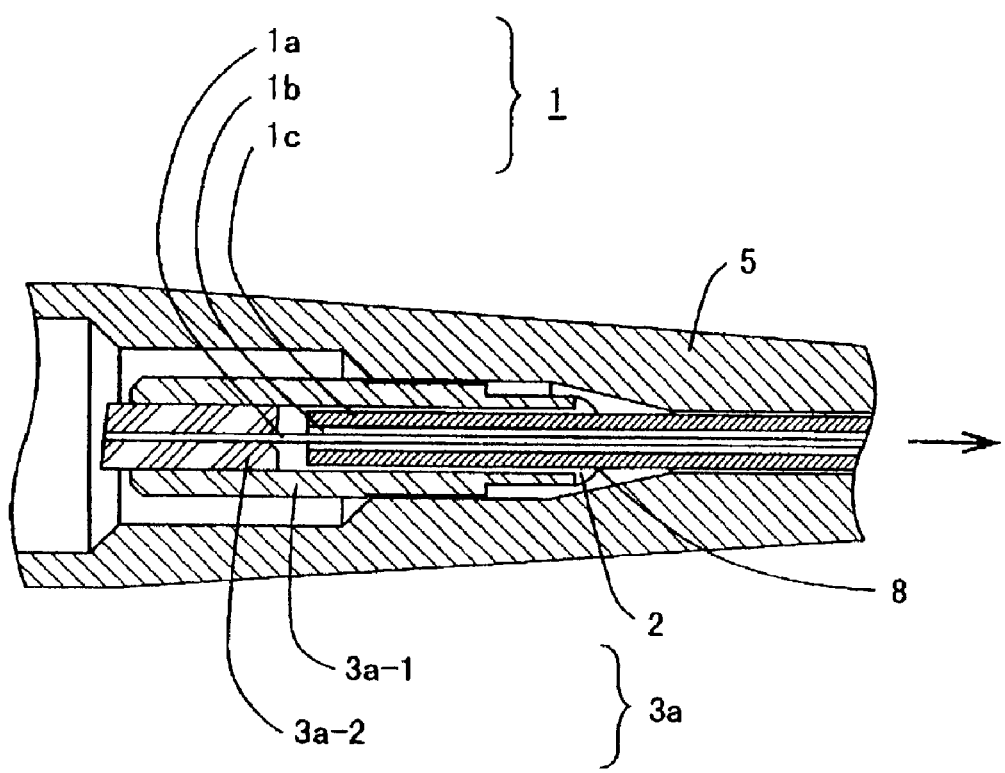
FIG. 1 is an enlarged sectional view of a conventional example.
Figure 2:
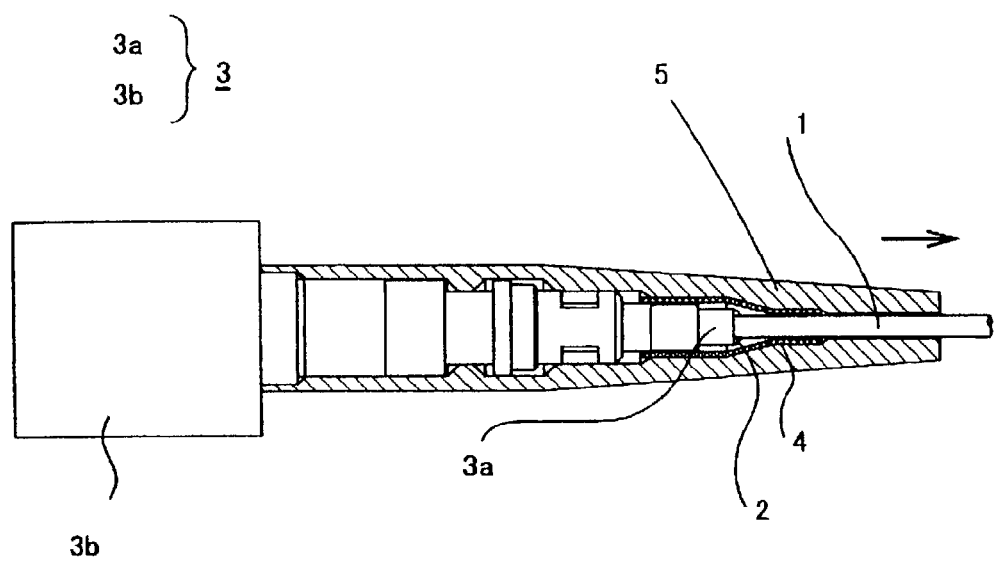
FIG. 2 is a sectional view of a first embodiment of the present invention.
Figure 3:
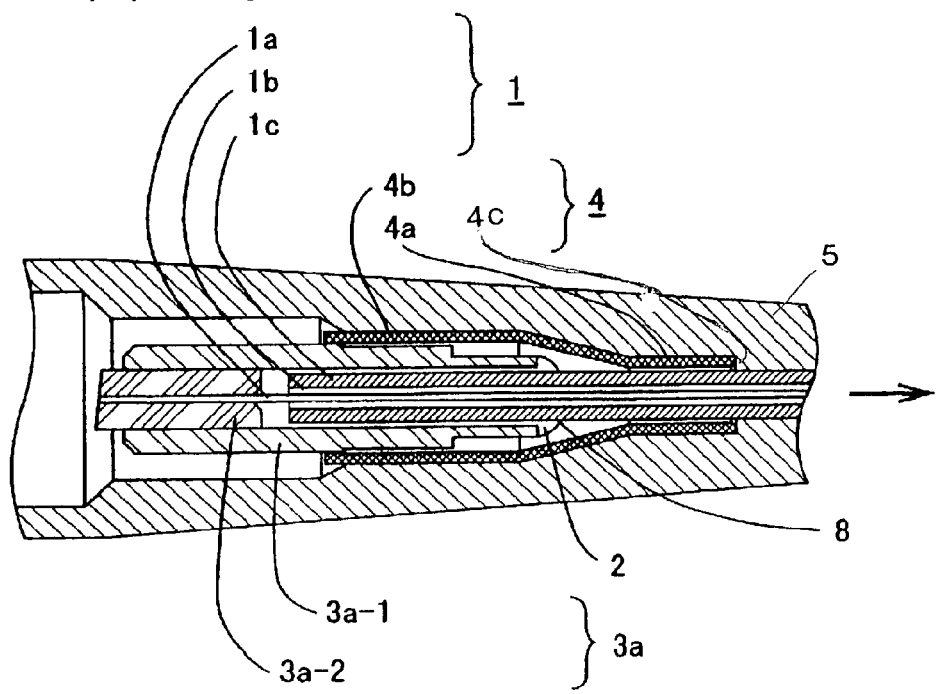
FIG. 3 is an enlarged sectional view of the first embodiment.

FIG. 2 is a sectional view showing an optical device in which an optical fiber is fixed and connected to an optical unit section by using a ferrule according to a first embodiment of the present invention. FIG. 3 is an enlarged sectional view showing the detailed structure of the vicinity of the fixing joint portion of the first embodiment of the present invention shown in FIG. 2.

The first embodiment of the present invention relates to an optical device comprising a rigid pipe and a flexible tube for covering the rigid pipe. Referring to FIGS. 2 and 3, an optical fiber 1 comprises a glass portion 1a having a core and a clad, a UV resin layer 1b provided on the outer periphery of the glass portion 1a, and a coating layer 1c made of a nylon or elastomer material and provided on the outermost periphery.

The rear end of the optical fiber 1 is mounted on a ferrule 3a. The ferrule 3a comprises a capillary 3a-2 made of zirconia and a metal blank 3a-1 for covering the capillary 3a-2. The glass portion 1a is press-fitted into the capillary. The optical fiber 1 is fixed to the tip of the blank 3a-1, i.e., the tip of the ferrule 3a, with an adhesive. The adhesive fixed portion constitutes a fixing joint portion 2 for fixing the optical fiber 1 to an optical unit section (the blank 3a-1 in this embodiment). In the fixing joint portion 2, either adhesive fixing or mechanical caulking fixing may be made.

A rigid pipe 4 covers a portion of the blank 3a-1 and the fixing joint portion 2, and the tip portion 4a thereof is positioned on the outside of the optical fiber 1 exposed from the front end of the fixing joint portion 2. There is a gap for providing flexibility between the tip portion 4a and the optical fiber 1.

In this embodiment, the rigid pipe 4 comprises, for example, a metal pipe such as a stainless pipe or the like. The rigid pipe 4 is not fixed to the blank 3a-1 so that it is movable relative to the blank 3a-1. The inner surface of the tip 4c of the rigid pipe 4 is chamfered. As the material for the rigid pipe 4, stainless steel, a metal selected from Fe, Cu and Al, or an alloy (for example, brass) containing at least one of these metals can be used. Besides the metal materials, hard resins and ceramics can also be used.

The ferrule 3a and the rigid pipe 4 are covered with a flexible tube 5. The flexible tube 5 comprises a flexible cylinder made of, for example, rubber. In this embodiment, the flexible tube 5 is provided for covering the rigid pipe 4, but not fixed.

In this embodiment having the above construction, strength to bending stress is high, and thus the breakage resistance of the optical fiber can be improved.

Figure 4:
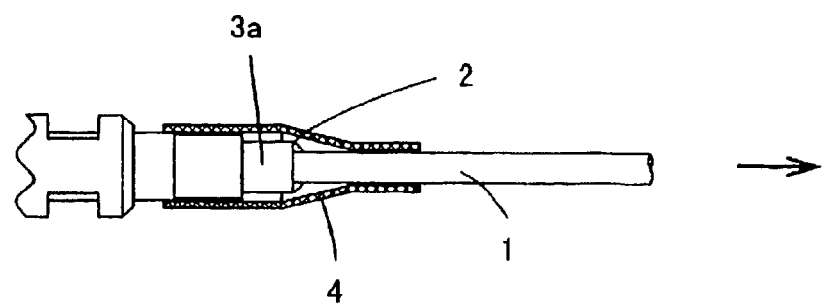
FIG. 4 is a sectional view of a second embodiment of the present invention.

Although, in the above-descried first embodiment, the flexible tube 5 is provided, a structure without the flexible tube 5 exhibits the same effect. FIG. 4 is a sectional view showing the structure in the vicinity of a fixing joint portion of an optical device without a flexible tube according to a second embodiment of the present invention.

Referring to FIG. 4, this embodiment has the same construction as the first embodiment except that the flexible tube 5 of the first embodiment is not provided. In the structure of the second embodiment, the rigid pipe 4 comprising a metal pipe is provided to improve the breakage resistance as compared with the above-described conventional example.

As a result of experiment performed by the inventors for comparing breaking loads in the first and second embodiments with breaking load in the conventional example comprising the flexible tube without the rigid pipe, the breaking loads of the first and second embodiments were respectively 4.5 times and 2 times as high as the breaking load of conventional example.

Figure 5:
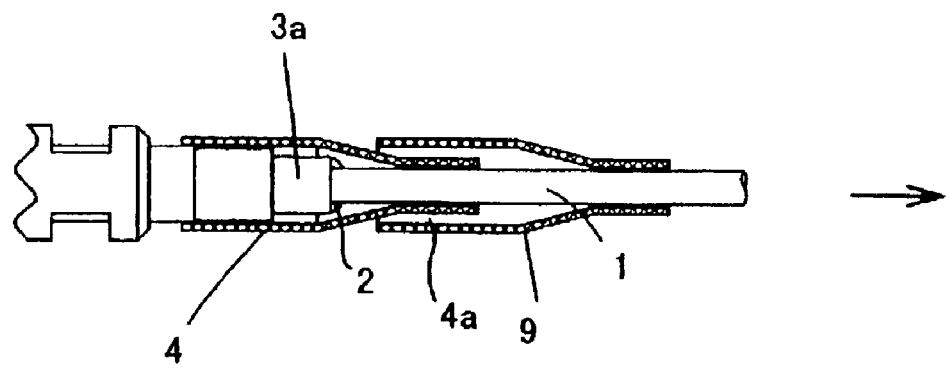
FIG. 5 is a sectional view of a third embodiment of the present invention.

FIG. 5 is a sectional view showing a ferrule provided with an extension pipe according to a third embodiment of the present invention.

In the third embodiment of the present invention, the extension pipe is provided. The basic construction of the third embodiment is the same as the first and second embodiments, but an extension pipe 9 is provided to cover the outer periphery of the tip portion 4a of the rigid pipe 4 and extend to the optical fiber extending forward beyond the tip portion 4a. In this embodiment, the extension pipe 9 suppresses sharp bending of the optical fiber 1, thereby further improving the breaking load resistance as compared with a structure comprising only the rigid pipe 4.

Figure 6:
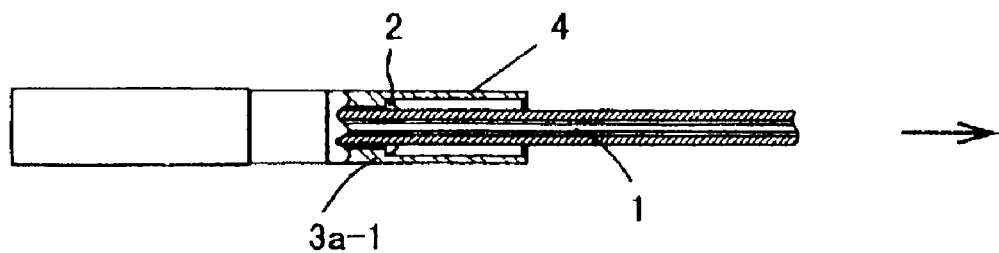
FIG. 6 is a sectional view of a fourth embodiment of the present invention.

FIG. 6 is a sectional view showing a rigid pipe formed integrally with a ferrule according to a fourth embodiment of the present invention. In the first to third embodiments, the rigid pipe is provided to be movable relative to the blank constituting the ferrule. However, in the fourth embodiment, as shown in FIG. 6, the rigid pipe 4 is integrated with the blank 3a-1 so that both are fixed.

In integration, the tip portion of the blank 3a-1 can be formed with a space for providing flexibility in bending of the optical fiber so that the tip portion of the blank 3a-1 can be caused to function as the rigid pipe 4. Alternatively, another part serving as the rigid pipe may be integrated with the blank 3a-1 by screwing or welding. In this embodiment, the tip portion of the blank 3a-1 (i.e., the rigid pipe 4 integrated with the blank 3a-1) is formed with a space for providing flexibility between the optical fiber 1 and the rigid pipe 4. Therefore, the tip portion of the blank 3a-1 functions as the rigid pipe 4, and the breakage resistance of the optical fiber 1 is improved.

Figure 7A:
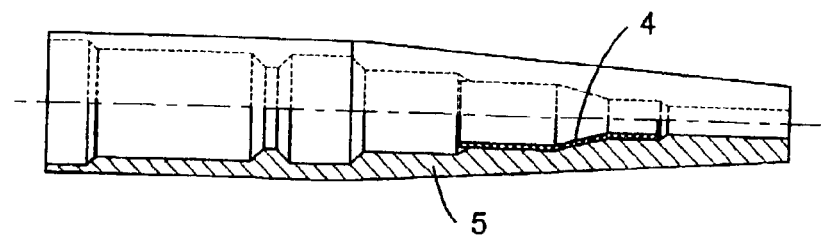
FIGS. 7A to 7D are sectional views respectively illustrating the first and fifth to seventh embodiments of the present invention.
Figure 7B:
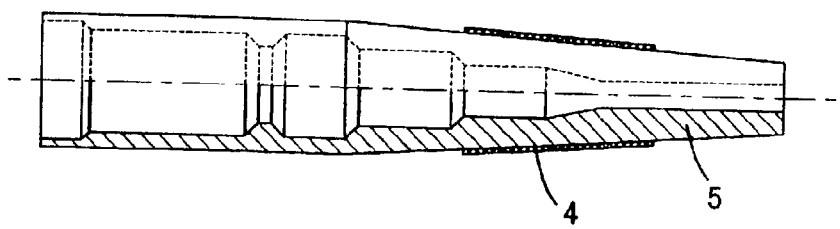
Figure 7C:
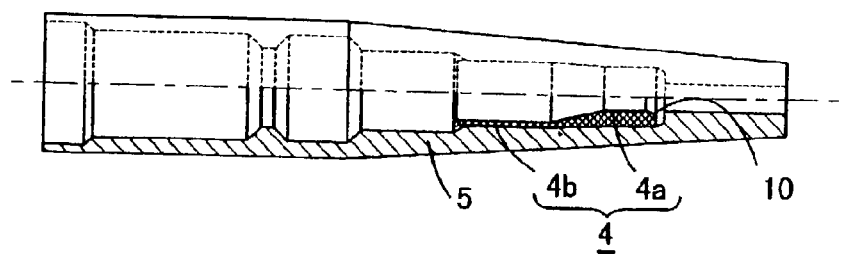
Figure 7D:
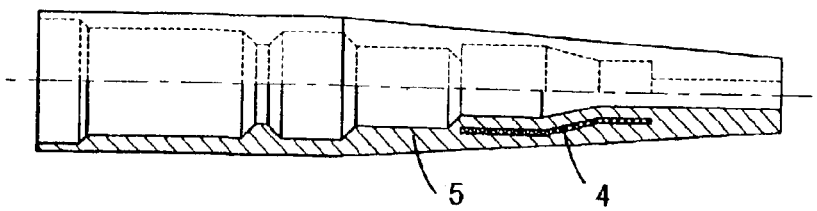

FIGS. 7B to D are sectional views respectively illustrating fifth to seventh embodiments of the present invention. FIGS. 7B to D respectively show the positions of rigid pipes in the fifth to seventh embodiments, and FIG. 7A shows the position of the rigid pipe in the first embodiment for comparison. In the fifth to seventh embodiments, the members other than the rigid pipe, such as the optical fiber 1, the optical unit section 3, the fixing joint portion 2 and the flexible tube 5, etc. are the same as the first embodiment, and thus a description is made with reference to FIGS. 7A to 7D by using the same reference numerals as FIGS. 2 and 3.

In the fifth embodiment of the present invention, referred to FIG. 7B, the rigid pipe 4 comprising a metal pipe is disposed on the outside of the flexible tube 5. In this embodiment, the rigid pipe 4 and the flexible tube 5 each are made individually, and the rigid pipe 4 press-fitted onto the outside of the flexible tube 5. In this embodiment, by providing the metal pipe serving as the rigid pipe 4, the breakage resistance is improved as compared with the conventional example.

In the sixth embodiment of the present invention, the shape of the rigid pipe 4 of the first embodiment is changed. Referring to FIG. 7C, in the sixth embodiment, the rigid pipe 4 has a shape in which the tip portion thereof is thickened, and the inner surface of the tip therof is chamfered to form a chamfer 10. In this embodiment, the chamfered portion is thick, and thus sharp bending of the optical fiber 1 at the tip 4c of the rigid pipe 4 is suppressed to further improve the effect of improving the breakage resistance by the rigid pipe 4. In this embodiment and the first embodiment, the chamfer 10 of the tip 4c of the rigid pipe 4 may comprise either an inclined plane surface or a curved round surface.

In the seventh embodiment of the present invention, the rigid pipe is buried in the flexible tube. In the first embodiment, referring to FIG. 7A, the rigid pipe 4 is provided along the internal surface of the flexible tube 5. In the seventh embodiment, referring to FIG. 7D, the rigid pipe 4 is buried in the flexible tube 5. In this embodiment, by providing the rigid pipe 4, the breakage resistance is improved as compared with the conventional example.

As described above, the present invention can provide an optical device which has a high breakage resistance of an optical fiber at the fixing joint portion where the optical fiber is fixed to an optical unit section and thus has high reliability.

The invention may be embodied in other specific forms without departing from the sprit or essential characteristics thereof. The present embodiment is therefore to be considered in all respects as illustrative and not restrictive, the scope of the invention being indicated by the appended clames and all variations which come within the meaning of claims are intended to be embraced therein.

What is claimed is:

1. An optical device comprising:
    a fixing joint portion fixing, to an optical unit section, an optical fiber extending forward;
    a rigid pipe covering an outer periphery of the optical fiber with a gap for providing flexibility therebetween, the rigid pipe extending rearward from a tip thereof to cover the outer peripheries of the optical fiber, the fixing joint portion and at least a forward portion of the optical unit section, the rigid pipe being a separate part from the optical unit section so as to be movable relative thereto; and a flexible tube covering the whole of the rigid pipe, and extending rearward to cover the forward portion of the optical unit section.

2. An optical device according to claim 1, wherein the flexible tube is extending forward to cover the optical fiber extending forward.

3. An optical device according to claim 1, wherein the rigid pipe is made of a metal.

4. An optical device according to claim 1, wherein the rigid pipe is made of a metal selected from the group consisting of Fe, Cu and Al and combinations thereof.

5. An optical device according to claim 1, wherein the rigid pipe is made of a resin.

6. An optical device according to claim 1, wherein the rigid pipe is made of a ceramic.

7. An optical device according to claim 1, wherein an inner surface of the tip of the rigid pipe is chamfered to provide an inclined surface.

8. An optical device according to claim 7, wherein a radial thickness of the rigid pipe is thicker at the chamfered tip than the rear end thereof.

9. An optical device according to claim 1, wherein an inner surface of the tip of the rigid pipe is chamfered to provide a rounded surface.

10. An optical device according to claim 9, wherein a radial thickness of the rigid pipe is thicker at the chamfered tip than the rear end thereof.

11. An optical device according to claim 1, wherein in the fixing joint portion, the optical fiber is fixed to the optical unit section by adhesion.

12. An optical device according to claim 1, wherein in the fixing joint portion, the optical fiber is fixed to the optical unit section by caulking.

* * * * *